May 27, 1952  W. L. ACKER, JR  2,598,203
ROTARY EARTH DRILL WITH FLUID PRESSURE FEED
Filed Jan. 15, 1951  2 SHEETS—SHEET 1

WILLIAM L. ACKER, JR.
INVENTOR.

BY Beale and Jones

Attorneys

Patented May 27, 1952

2,598,203

UNITED STATES PATENT OFFICE 2,598,203

ROTARY EARTH DRILL WITH FLUID PRESSURE FEED

William L. Acker, Jr., Scranton, Pa.

Application January 15, 1951, Serial No. 206,061

7 Claims. (Cl. 255—22)

This invention relates to improvements in rotary earth drill apparatus with fluid pressure feed.

An object of the invention is to provide in a rotary drill a feed system for advancing and retracting the drill spindle with the system extending uninterruptedly through the drill head and rotating mechanism so as to permit a much shorter overall length of apparatus for the same spindle travel.

A further object of my invention is to provide an entirely self contained reversible drill rotating mechanism with a drill spindle advancing and retracting pressure feed that extends through the bore of the reversible drill rotating mechanism.

A still further object of this invention is to provide a control for the rotation of the reversible drill rotating mechanism that is directly incorporated in the drill head and provided with a neutral whereby the drill spindle is not rotated while the prime mover drive continues in operation.

Another object of my invention is to provide a totally enclosed pressure advancing and retracting system for a drill spindle which obviates mechanical damage from without and prevents contamination of the parts from dirt and mud prevalent on a drilling project.

A still further object of my invention is to provide a pressure operated advancing and retracting mechanism which has a movable drill spindle that acts as a pressure cylinder with closed off ends and has contained therein a stationary hollow piston supported by a stationary double walled piston rod having two pressure passageways therethrough for conducting fluid pressure to either side of the piston to advance or retract the drill spindle whereby the parts can be smaller in size than other earth drilling apparatus of like capacity.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference can be had to the following detailed description taken in connection with the accompanying drawings in which.

Figure 1:
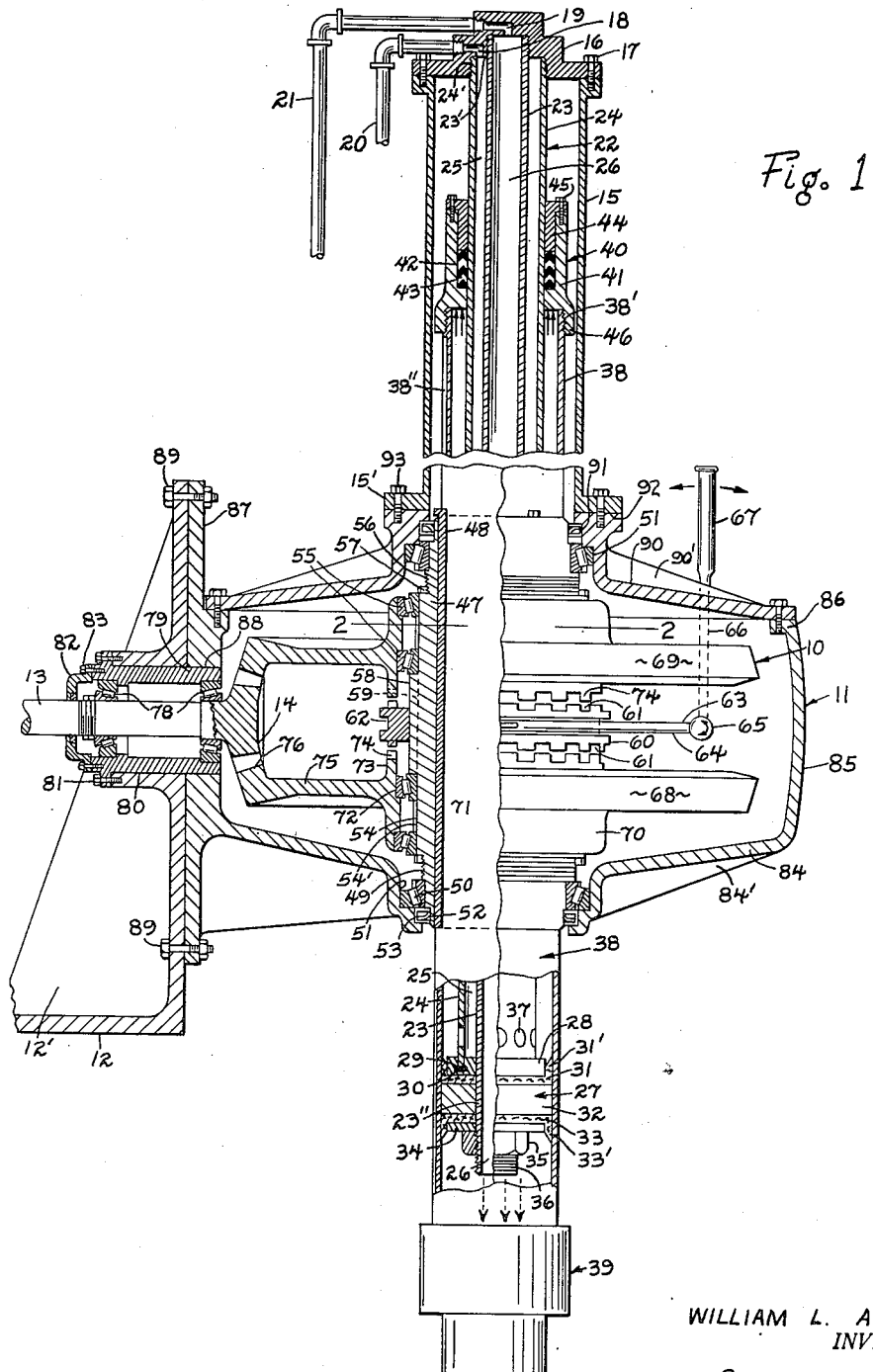
Fig. 1 is a side elevation with certain parts broken away showing the reversible rotary earth drill with advancing and retracting mechanism according to my invention.

My earth drilling apparatus is mounted in a rotary table generally indicated at 10 having a bore therethrough and contained within a housing 11 swivelly supported on a bracket 12 about a drive shaft 13 which rotates the table 10 through a drive pinion 14 mounted on the inner end thereof and within housing 11.

Supported by and extending from housing 11 is a tubular housing 15 having its bore in alignment with the bore of the rotary table 10 and with a top or cap 16 secured at its outer end by cap screws 17. Top 16 has two passageways 18 and 19 formed therein connected at their outsides with fluid pressure lines 20 and 21 respectively. A double walled hollow piston rod 22 has its inner wall 23 and its outer wall 24 threaded at their upper ends in supporting engagement with threaded recesses 23' and 24' in top 16 whereby passageway 18 is in communication with the space 25 between the inner and outer walls 23 and 24 while the passageway 19 is in communication with the hollow bore 26 of the stationary piston rod 22.

Supported in a stationary condition at the lower end of piston rod 22 is a piston 27. Piston 27 includes an annular plate 28 having an annular recess 29 in the top surface thereof for receiving the lower end of the outer cylindrical wall 24 of the piston rod 22 and having a packing 30 in the recess 29 against which the lower end of the outer wall 24 tightly abuts; a washerlike packing 31 positioned against the lower face of plate 28 with an upturned portion 31' surrounding the outer surface of the annular plate 28 and encircling the projecting lower end 23" of the inner wall 23; an intermediate annular plate 32 abutting against the lower face of washer 31 and surrounding the projecting end 23" of the piston rod 22; a second or lower washer 33 similar to washer 31 abutting the lower face of plate 32 and having a downturned flange 33'; and a lower annular plate 34 fitting over end 23" of rod 22 and over which flange 33' of washer 33 lies. A nut 35 threadedly received on the lower threaded end 36 of piston rod 22 secures to the lower end of piston rod 22 the parts just described making up piston 27.

It will be noted that the bore 26 of the piston rod 22 communicates with the space below piston 27 while the annular space 25 between the walls 23 and 24 of piston rod 22 communicates with the space above piston 27 through a plurality of spaced apertures 37 formed in the lower end of outer wall 24 of the piston rod 22.

Longitudinally slidable and rotatably mounted over stationary piston 27 is a drill rotating cylinder or spindle 38 having a drill chuck 39 attached to and closing off its lower end while an annular head 40 is attached to its upper or top end which is exteriorly threaded as indicated at 38'.

Annular head 40 has an annular longitudinally extending body portion 41 with an annular stuffing box 42 formed on the inside thereof to receive a chevron type packing 43 which provides a sliding seal fit with the outer wall 24 of piston rod 22. Packing 43 is held in place by a packing gland 44 secured to the top of head 40 as by cap screws 45. The lower portion of head 40 is formed with an annular depending flange 46 which is threaded interiorly and engages with the threaded top 38' of drill rotating cylinder or spindle 38. The outer surface of drill spindle 38 has formed therein three equally spaced longitudinally extending keyways or slots 38" throughout substantially the entire length thereof for sliding keying thereto a surrounding hollow driving quill 47 hereinafter described.

Figure 2:
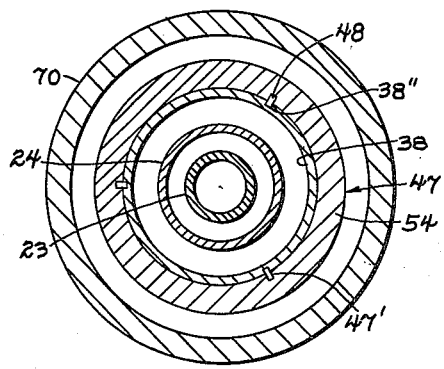
Fig. 2 is a top plan view along section line 2—2 of Fig. 1.

Hollow driving quill 47 is rotatably mounted in the bore of rotary table generally indicated at 10 and slidingly receives therein the drill rotating cylinder or spindle 38 which is keyed thereto by the longitudinally extending keys 48, see also Fig. 2, engaged in keyways 38" in drill spindle 38 and corresponding keyways 47' in the interior of hollow driving quill 47. Thus, when fluid pressure is applied to the bore 26 of piston rod 22, the fluid communicates with the space below the lower end of stationary piston 27 and drill receiving chuck 39 closing off the bottom end of drill rotating cylinder to advance or force drill rotating cylinder 38 downward.

Likewise, when fluid pressure is applied to the passageway 25, between the walls 23 and 24 of piston rod 22, it passes out through the apertures 37 in the lower end of wall 24 to the space above stationary piston 27 and the closed off upper end of drill rotating cylinder 38 to retract or force drill rotating cylinder 38 upward.

Hollow driving quill 47 is of general cylindrical shape with stepped exterior cylindrical surfaces. A stepped cylindrical surface 49 formed toward each end of quill 47 serves to receive thrust and antifriction bearings 50 which are seated in recessed ends 51 formed in each end of housing 10 whereby the ends of quill 38 are supported in the housing 10. The extreme ends of driving quill 47 are further provided with cylindrical stepped surfaces 52 within which are seated annular oil seals 53 which seal off the ends of housing 10 with the ends of driving quill 47.

A pair of intermediate stepped cylindrical surfaces 54 with longitudinal slots 54' therein formed on driving quill 47 serve to mount antifriction thrust bearings 55 which rotatably support the rotary table 10 thereabout. Suitable threaded stepped surfaces 56 are also formed toward the ends of driving quill 47 adjacent the outer ends of stepped surfaces 54 to receive annular interiorly threaded rings 57 for securing the outermost of the thrust bearings 55.

Still referring to the exterior surface of driving quill 47 there is formed on the center portion thereof a cylindrical surface 58 which is splined at 59 to slidingly receive a surrounding annular clutch element 60 which rotates therewith.

Annular clutch element 60 slidably mounted on driving quill portion 58 is formed with serrations in its upper and bottom faces while an annular groove 62 is formed in the center portion thereof. Fitting into the annular center groove 62 is a bifurcated control element 63 for slidably shifting clutch element 60 up or down along driving quill 47 for engagement with the reversible rotary table 10 to be described hereinafter. Clutch control element 63 is formed with an outwardly projecting stem 63 which is rigidly attached at its outermost end to a transversely extending rockable control shaft 65 supported in and projecting outwardly through a side wall of the housing 10. The outer end of shaft 65 has rigidly secured thereto an upwardly projecting hand control lever 67 which may be rocked in either direction as shown by the arrows to either slide clutch element 60 up or down along driving quill 47 for engagement with the continuously rotating gears of the rotary table 10 to be described.

Rotary table 10 as described above rotates within housing 10 and about driving quill 47 mounted and supported in its bore. Table 10 comprises an ahead gear 68 and a reversing gear 69 both identical in construction but reversely mounted and driven by common pinion 14 with which they mesh. Gear 68 will be described. Gear 68 has a central hub 70 having a central bore 71 therethrough formed with spaced annular recesses 72 therein for receiving the antifriction thrust bearings 55, described heretofore, that support in its bore the driving quill 47. Hub 70 of gear 68 has an annular flange portion 73 projecting in the direction of its bore and it has formed therein jaws 74 which match with the serrations 61 on each face of clutch 60 adjacent which they are disposed for selective engagement. Thus, clutch 60 may be slid into engagement with either the jaws 74 of ahead rotating gear 68 or reverse rotating gear 69. Each gear is formed with an outwardly extending circular web 75 which has integrally formed on its peripherial portion an annular gear portion 76 which meshes with the pinion gear 14 carried by drive shaft 13, described above. Drive shaft 13 is supported in suitable antifriction bearings 78 mounted in a sleeve 79 secured in a bore 80 in bracket 12 by cap screws 81. A suitable annular sealing cap 82 secured to the end of sleeve 80 by cap screws 83 seals off shaft 13. Bracket 12 is formed with a transversely extending strengthening web 12 and a circular platelike vertical portion 12". Bracket 12 may be mounted in a stationary, portable or vehicular frame where the drive shaft 13 will be connected to a motor or prime mover.

Housing 11 will now be described in more detail. It is of general cylindrical shape having a bottom portion 84 with strengthening webs 84' extending outwardly and transversely thereto and with an upwardly extending annular wall portion 85 terminating in an annular flat surfaced flange portion 86 at its top. Wall 85 has formed thereon a support base 87 in the form of a vertically extending circular plate 87 apertured at its center at 88 to receive sleeve 79 projecting from a similar vertically extending circular plate portion 12" on bracket 12. Housing 11 may be swivelled about the axis of its mounting plate 87 which is common to the axis of the drive shaft 13 carrying drive pinion 14 driving gears 68 and 69 continuously in reverse directions of rotation. This plate 87 may be secured to plate 12" on support bracket 12 by suitable through bolts as indicated at 89 after it is rotated or swivelled to a selected position.

Housing 11 is provided with a circularlike top plate 90 having transverse outwardly extending strengthening webs 90' and a pair of stepped recesses 51 and 91 at its central bore as does the bottom portion 84 for receiving respectively the antifriction bearings 50 and the oil seals 53, described above. The top central surface 92 of top member 90 is disposed in a plane transverse to the bore of housing 11 and serves as a seat for mounting the lower end of tubular housing 15 having a flange 15' at the bottom thereof which is secured to flat surface end 92 by cap screws 93.

In Fig. 2 I have shown a cross sectional top plan view along section line 2—2 in Fig. 1. The central hub 70 of the reversing gear 69 is only shown for that gear. The inner and outer walls 23 and 24 of the doubled walled hollow piston rod 22 are shown with inner wall 23 defining the central bore of the drilling apparatus. The stepped cylindrical portion 54 of driving quill 47 is shown surrounding the drill rotating cylinder or spindle 38 which is keyed thereto by keys 48 that permit a longitudinal sliding fit yet rotate the drill spindle when driving quill 47 is coupled to either ahead gear 68 or reverse gear 69 by clutch 60 as described heretofore.

Figure 3:
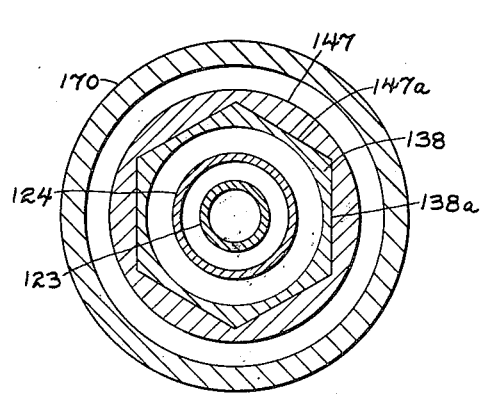
Fig. 3 is a view similar to Fig. 2 but showing polygonal cross sectional shaped interior or a driving quill having therein a driving cylinder or spindle of like outside configuration and slidingly mounted therein.

In Fig. 3 there is shown a modified form of slidably coupling drill rotating cylinder or spindle here designated 138 within driving quill here designated 147. The inner surface 147a of hollow driving quill 147 is of hexagonal shape, for example, and the outer surface 138a of drill rotating spindle 138 is of like hexagonal shape to be slidingly received within driving quill 147 yet rotated thereby. The inner and outer walls of the stationary piston rod are respectively designated 123 and 124.

The earth drilling apparatus according to my invention provides for a compact self-contained reversible drill rotating mechanism that carries within the bore of the drill spindle fluid pressure power means by which the drill spindle is forced into the earth or retracted therefrom. Control of the apparatus is at the operator's fingertips with the rotation selection lever 67 being positioned directly on the machine along with suitable fluid pressure control valves, not shown, for the fluid pressure lines 20 and 21 which supply pressure to advance or retract the rotary drill spindle 38. Since the power advancing and retracting mechanism is housed within the bore of the apparatus a much shorter overall length or height of drill apparatus is provided for the same longitudinal travel of the spindle. Contrasted with this earth drilling apparatus according to my invention is other fluid pressure feed systems for drill apparatus employing fluid pressure cylinders connected to the drill spindle through cumbersome exterior crossheads or a fluid pressure cylinder attached to the end of the drill rotating spindle both of which require a much greater overall height or length.

Another distinct advantage secured in my earth drilling apparatus is that all working parts of the rotating and fluid pressure systems are totally enclosed and they are never exposed to the open and hence run no chance of mechanical damage or contamination from the dirt and mud prevalent on a construction project.

As the drill spindle in my apparatus is itself the fluid pressure cylinder, all parts are correspondingly smaller in size than other earth boring machines of like capacity.

Control of my drilling apparatus is directly at the point of operation on the machine. The drill may be rotated in either direction and longitudinally advanced or retracted by selected controls directly at the operation point.

A further distinct advantage in the earth drilling apparatus according to my invention is the flexibility of the apparatus whereby the rotation of the drill may be interrupted without stopping the prime mover which has coupled thereto the fluid pressure pump that may be continuously operated affording control pressure at all times whether the drill is rotated or in a stopped or neutral condition.

I claim as my invention:

1. In an earth drilling apparatus, a reversible rotary table having a bore therethrough for a hollow driving quill, a housing for said table having a tubular housing extending therefrom provided with a top and in alignment with the bore of the table, a hollow driving quill rotatably mounted in the bore of said table adapted to be connected to said reversible rotary table and rotated in either direction thereby, a drill rotating cylinder slidingly keyed in the hollow driving quill and rotatable therewith having a drill chuck closing off its lower end and an annular head at its top end, a double walled hollow piston rod within said drill driving cylinder and said annular head thereon suspended at its upper end from said top of the tubular housing and carrying upon its lower end a piston upon which said drill rotating cylinder is adapted to move, said double walled hollow piston rod being provided with a central bore extending to the space below said piston and above said closed off lower end of the drill rotating cylinder and the space provided between said double walls of the hollow piston rod communicating with the space above said piston and below said annular head on the drill rotating cylinder whereby pressure may be communicated to the space at either side of said piston to advance the drill rotating cylinder or to retract the same, and whereby said reversible rotary table rotates in either direction said hollow driving quill and said drill rotating cylinder slidingly keyed therein.

2. An earth drilling apparatus according to claim 1 wherein said reversible rotary table comprises two vertically spaced apart drive gears rotatably mounted and reversely rotated about said hollow driving quill with clutch engaging elements on the adjacently disposed faces thereof and including a clutch jaw intermediate said two spaced apart gears slidingly keyed to the outer surface of said driving quill adapted to be positioned intermediate and out of engagement with or to be slid into engagement with either of said jaw receiving elements on said drive gears whereby said drill rotating cylinder slidingly keyed in said driving quill is rotated in either direction of rotation or permitted to remain in a non-rotary condition.

3. An earth drilling apparatus as described in claim 2 including a drive shaft and a drive pinion thereon meshing with and rotating said gears of the rotary table in opposite directions, a mounting bracket for said pinion drive shaft and wherein said rotary table housing is adapted to be rotatably mounted on said bracket to swivel about the axis of said drive shaft whereby said drilling apparatus can be swiveled about the axis of said drive shaft.

4. In an earth drilling apparatus, a reversible rotary table having a bore therethrough for a hollow driving quill, a housing for said table having a tubular housing extending therefrom provided with a top and in alignment with the bore of the table, a hollow driving quill having an inner polygonal shaped surface rotatably mounted in the bore of said table adapted to be connected to said reversible rotary table and rotated in either direction thereby, a drill rotating cylinder having a similar shaped polygonal outer surface slidingly mounted in the hollow driving quill and rotatable therewith and having a drill chuck closing off its lower end and an annular head at its top end, a double walled hollow piston rod within said drill driving cylinder and said annular head thereon suspended at its upper end from said top of the tubular housing and carrying upon its lower end a piston upon which said drill rotating cylinder is adapted to move, said double walled hollow piston rod being provided with a central bore extending to the space below said piston and above said closed off lower end of the drill rotating cylinder and the space provided between said double walls of the hollow piston rod communicating with the space above said piston and below said annular head on the drill rotating cylinder, whereby pressure may be communicated to the space at either side of said piston to advance the drill rotating cylinder or to retract the same, and whereby said reversible rotary table rotates in either direction said hollow driving quill and said drill rotating cylinder slidingly mounted therein.

5. In an earth drilling apparatus, a reversible rotary table having a bore therethrough for a hollow driving quill and comprising two vertically spaced apart drive gears rotatable in opposite directions, a housing for said table provided with a bore therethrough in alignment with the bore of said reversible rotary table with recessed annular end portions and having a tubular housing in alignment with said bore extending outward from one of the recessed ends and provided with a top having a pair of passageways therethrough, a hollow driving quill rotatably mounted in the bore of said table and housed by antifriction bearings interposed in said housing recesses and by antifriction bearings interposed between the bore of said table and the quill and adapted to be connected to either of said two drive gears and rotated in either direction thereby, clutch means slidingly connected about said hollow driving quill between said two vertically spaced gears adapted to be connected to either of said drive gears to rotate said quill therewith, a drill rotating cylinder slidingly keyed in the hollow driving quill and rotatable therewith having a drill chuck closing off its lower end and an annular head at its top end provided with an annular stuffing box, a double walled hollow piston rod within said drill driving cylinder and said annular head thereon where it is surrounded by said annular stuffing box suspended at its top end from said top of the tubular housing with each passageway of said pair of passageways in the top respectively in communication with said hollow piston rod bore and the space formed by said double walls of the piston rod, a piston attached to the lower end of said hollow piston rod upon which said drill rotating cylinder is adapted to move, said double walled hollow rod being provided with a central bore extending to the space below said piston and above said closed off lower end of the drill rotating cylinder and the space provided between said double walls of the hollow piston rod communicating with the space above said piston and below said annular head on the drill rotating cylinder whereby pressure may be communicated to the space at either side of said piston to advance the drill rotating cylinder or to retract the same when pressure is introduced through said pair of passageways in said top of the housing, and whereby said drill rotating cylinder keyed within said quill is rotated in either direction when said quill is connected by said clutch to either of said oppositely rotatable drive gears in the rotary table.

6. An earth drilling apparatus as described in claim 5 including a drive shaft and a drive pinion thereon meshing with and rotating said gears of the rotary table in opposite directions, a mounting bracket for said pinion drive shaft and wherein said rotary table housing is adapted to be rotatably mounted on said bracket to swivel about the axis of said drive shaft whereby said drilling apparatus can be swiveled about the axis of said drive shaft.

7. In an earth drilling apparatus as described in claim 6 wherein the inner surface of said hollow driving quill is of a polygonal shape and the outer surface of said drill rotating cylinder slidingly received in said hollow driving quill is of similar polygonal shape to the inner surface of said quill.

WILLIAM L. ACKER, Jr.

REFERENCES CITED

The following references are of record in the file of this patent:

UNITED STATES PATENTS

| Number | Name | Date |
|---|---|---|
| 1,954,050 | Moon | Apr. 10, 1934 |
| 2,415,572 | Jaques | Feb. 11, 1947 |